United States Patent [19]

Harriehausen et al.

[11] Patent Number: 5,383,628
[45] Date of Patent: Jan. 24, 1995

[54] OVERHEAD LUGGAGE COMPARTMENT, ESPECIALLY FOR PASSENGER AIRCRAFT

[75] Inventors: Michael Harriehausen, Hamburg; Dieter Kasch, Buxtehude; Heinz Manthey, Hamburg, all of Germany

[73] Assignee: Deutsche Aerospace Airbus GmbH, Hamburg, Germany

[21] Appl. No.: 144,572

[22] Filed: Oct. 28, 1993

[30] Foreign Application Priority Data

Oct. 28, 1992 [DE] Germany ............... 9214592[U]

[51] Int. Cl.⁶ .............................................. B64D 11/00
[52] U.S. Cl. ................................. 244/118.1; 244/118.5; 312/266; 312/247
[58] Field of Search ................ 244/118.1, 118.5, 119; 312/266, 247, 248, 269, 272, 319.1, 7.1, 7.2, 325, 326, 28; 105/321, 315; 5/9, 10 R

[56] References Cited

U.S. PATENT DOCUMENTS 4,275,942 6/1981 Steidl .
4,368,937 1/1983 Palombo et al. ................ 312/269
5,096,271 3/1992 Portman .......................... 244/118.5
5,244,269 9/1993 Harriehausen et al. .

Primary Examiner—Galen L. Barefoot
Attorney, Agent, or Firm—W. G. Fasse; W. F. Fasse

[57] ABSTRACT

An overhead luggage compartment for a passenger conveyance is secured to a fixed overhead structure by a single guide lever at each end of the movable trough that can be tilted up or down. Each guide lever has one end journalled to the fixed overhead structure and one end journalled to a respective side wall of the trough. Two gear sectors (6, 7) mesh with a common gear wheel journalled to the guide lever between the gear sectors which have a gear center coinciding with the journal axes of the journals that secure the guide lever. One gear segment is rigidly secured to the overhead structure. The other gear segment is rigidly secured to the trough sidewall. The gears control the up and down motion of the trough. A biasing spring and a shock absorber are also provided.

10 Claims, 2 Drawing Sheets

OVERHEAD LUGGAGE COMPARTMENT, ESPECIALLY FOR PASSENGER AIRCRAFT

FIELD OF THE INVENTION

An overhead luggage compartment is constructed for use in a passenger conveyance, such as a passenger aircraft or bus or railway car.

BACKGROUND INFORMATION

Conventional luggage compartments for the above stated purpose comprise a housing that is part of the fixed overhead structure and a movable shell or trough that can be lowered for putting luggage into the trough or for removing luggage out of the trough and that can be raised into a closed position inside the housing which is open downwardly. The housing has two lateral walls and so has the trough, whereby a guide system is arranged inside the trough or bin. The raising and lowering can be performed as a tilting motion of the bin.

Overhead luggage compartments, troughs or bins which can be raised and lowered have the advantage that in the closed raised position of the trough, the trough does not interfere with the free movement of a passenger in the cabin and that in the opened position the trough is easily accessible for the easy insertion and removal of luggage pieces.

U.S. Pat. No. 4,275,942 (Steidl), issued on Jun. 30, 1981, discloses a storage bin mechanism for use in passenger airplanes. The bin is connected to a fixed overhead downwardly open housing by two linkage mechanisms driven by respective pistons cylinder devices. Each linkage mechanism forms a pivoted quadrangle. The pivoted arms are of unequal length and so proportioned that the bin moves from its stowed position downwardly and slightly forward at the same time tilting slightly for ease of access. The arms engage each other in the downward position to increase the rigidity. A so-called spring cartridge or piston cylinder device is connected to the upper arms and to the lower arms of each quadrangle to counter-balance the weight in the bin and to hold the bin in the downward, open position. The upper arms of the two quadrangles are interconnected by a so-called torque shaft or tube that is connected through a lever to a further piston cylinder device. Since one end of each lever of each quadrangle is pivoted (at 11, 12) to the respective side wall of the bin, the bin itself is part of the quadrangle and thus must be correspondingly strong. The downwardly facing end of the upper lever that is pivoted to the bin is formed with a fork-shaped abutment against which the lower lever abuts when the bin is opened. This feature is intended to limit the downward movement of the bin and to provide a certain stiffness and stability to the pivoting quadrangles, especially in the lowermost position of the bin. However, when the lower lever disengages from the abutment the lateral stability of the system, that is stability in the longitudinal direction of the bin, leaves room for improvement. Further, the pivot joints must take up all the occurring loads caused by the weight of the luggage in the bin and by the forces applied for opening and closing the bin. Thus, the pivot joints and the levers themselves require a rather sturdy construction to provide at least some lateral stability. Additionally, the lateral walls of the housing and of the shell must be reinforced at least at the pivot junctions of which the Steidl structure requires eight such pivot joints, namely four for each linkage, whereby two pivot points 16 and 17 are pivoted to each side of the fixed structure, while two more points 11 and 12 are pivoted to each side wall of the bin. Such a structure leaves room for improvement.

OBJECTS OF THE INVENTION

In view of the foregoing it is the aim of the invention to achieve the following objects singly or in combination:

- to replace the link lever drive as described above by a gear drive that requires fewer connecting pints, namely one connecting pivoting or journalling point on the fixed structure and one connecting pivot or journal point on the lateral wall of the luggage holding trough or bin at each bin end;
- to reduce the manufacturing assembly and maintenance effort and expense for a structure of the type described above;
- to bias the entire structure in such a way that an automatic closing of the trough or bin from its open position is prevented by a self-locking feature;
- to make sure that the opening and closing motions take place in a controlled manner with a limited speed to prevent accidents;
- to make sure that the trough or bin lowers vertically and uniformly along its entire length, even if the bin is nonuniformly filled with luggage to prevent that one end of the bin lowers more than the other end or vice versa; and
- to control the trough movement by a respective selection of gear ratios in a guide and suspension mechanism.

SUMMARY OF THE INVENTION

The above objects have been achieved according to the invention by a guide suspension system which comprises two identical guides at each end of the trough between the trough end walls and vertically extending walls of the fixed overhead structure. Each suspension guide system has a guide lever, one end of which is journalled to the fixed structure while the other end is journalled to a the trough end wall. The lever cooperates with two gear sectors and a gear wheel arranged between the gear sectors to mesh with both gear sectors. The gear wheel is rotatably mounted or journalled in a fixed position on the lever, whereby the rotational axis of the gear wheel is positioned on a connecting line between the two journal axes of the lever and of the gear sectors. One gear sector is rigidly connected to the fixed structure in such a position that its gear center coincides with the first journal axis of the guide lever. The other gear sector is so positioned on the side wall of the trough that its gear center coincides with the second journal axis of the guide lever. Due to the meshing of the gear wheel with both gear sectors throughout any downward movement of the trough and throughout any upward movement of the trough, a substantial lateral stability is achieved, whereby the trough cannot tilt in response to an uneven loading of the trough.

Another advantage of the invention is seen in that the present luggage compartment requires only one lever at each end of the trough rather than two levers so that the number of connecting points are reduced from eight to four. This construction substantially reduces the effort and expense for the manufacture, assembly, and maintenance of the present system as compared to conventional systems. Moreover, by using different gear ratios, it is possible to easily accommodate different trough sizes with the present guide suspension systems.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
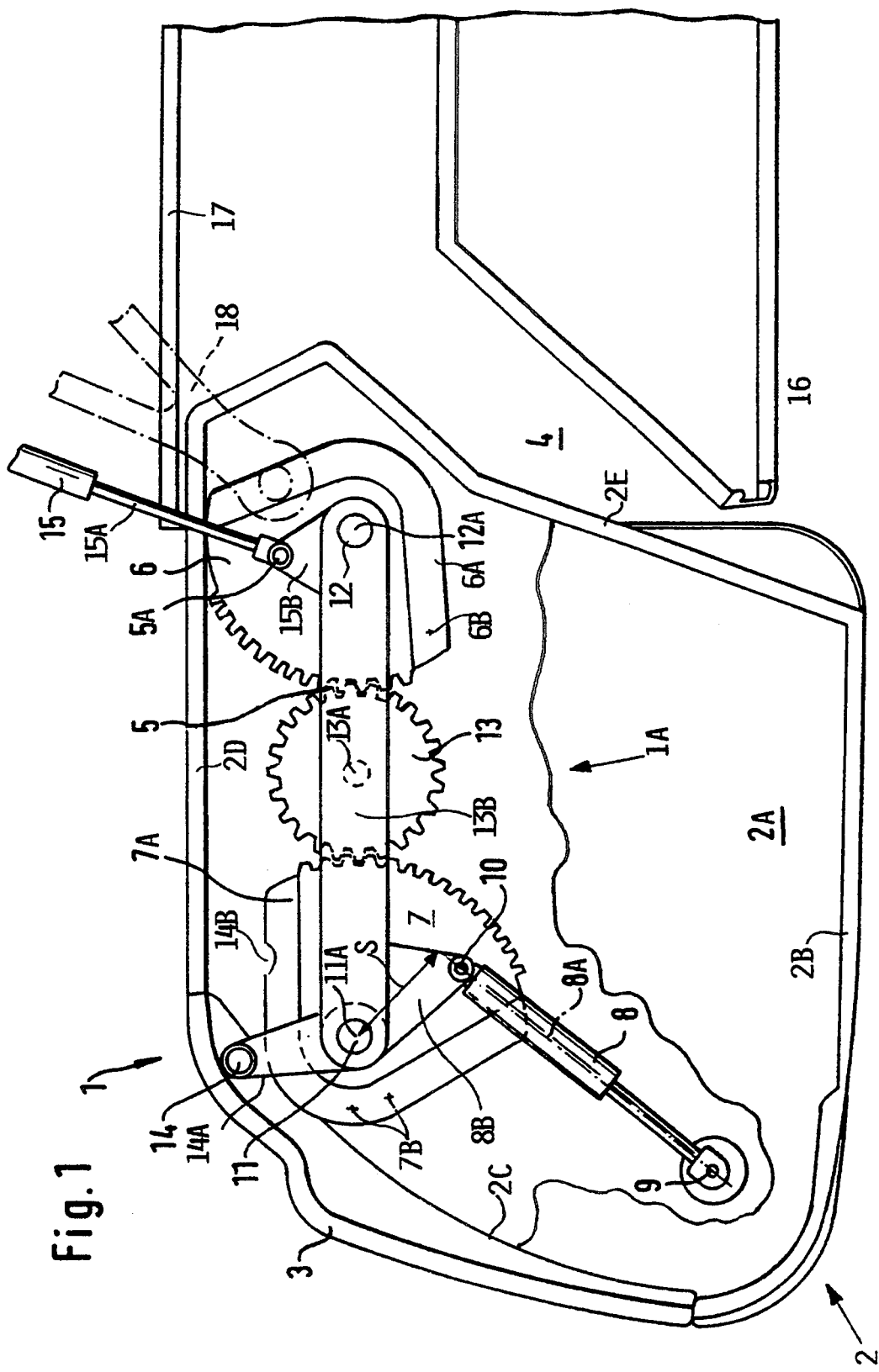
FIG. 1 shows a side view in the direction of the longitudinal axis of the luggage compartment when the luggage holding trough or bin is in its closed position.

FIG. 1 shows the luggage compartment 1 with its luggage holding trough 2 in the opened position. Only one side is shown, because the other side is mirror-symmetrical to the shown side. These luggage compartments 1 normally extend in rows along the ceiling structure 17 of an aircraft alongside a ceiling cover 16. The ceiling with its cover is held in place by conventional ceiling mounts 18. These ceiling mounts hold a fixed housing 3 and fixed vertically extending walls 4 between neighboring troughs 2. The covering 3 closes the trough 2 in its upper position shown in FIG. 1. Each trough has two side walls 2A, a bottom 2B interconnecting the side walls, a front opening 2C, a top reinforcement 2D, and a rear reinforcement 2E. A guide and suspension system 1A secures the trough 2 to the fixed side wall 4 as will be described in more detail below. Only one guide suspension system 1A is described, since the other is identical to the one shown.

Each guide suspension system 1A comprises a single guide lever 5. In FIG. 1, the left-hand end of the guide lever 5 is journalled to the fixed side wall 4 of the fixed overhead structure by a journal 11 having a first journal axis 11A. The right-hand end of the guide lever 5 is journalled to the side wall 2A of the luggage trough 2 by a journal 12 having a second journal axis 12A. Thus, the guide lever 5 is rotatable relative to the fixed side wall 4 and relative to the side wall 2A of the trough 2. A first gear sector 7 is rigidly secured to the fixed side wall 4. For this purpose the gear sector 7 has a reinforced rim 7A rigidly secured to the wall 4, for example by rivets or screws shown at 7B. Similarly, a second gear sector 6 is rigidly mounted to the side wall 2A of the trough 2. For this purpose the gear sector 6 has a reinforcing rim 6A riveted or screwed to the side wall at 6B. The gear segment 7 is so positioned that its gear center coincides with the first journal axis 11A. The second gear sector 6 is so positioned that its gear center coincides with the second journal axis 12A. Each of the gear sectors 6 and 7 meshes with a gear wheel 13 journalled to the guide lever 5 by a journal 13A positioned on a connection line 13B between the two journal axes 11A and 12A. The journal 13A is in a fixed position, but permits the rotation of the gear wheel 13 which always meshes with both gear sectors 6 and 7.

Figure 2:
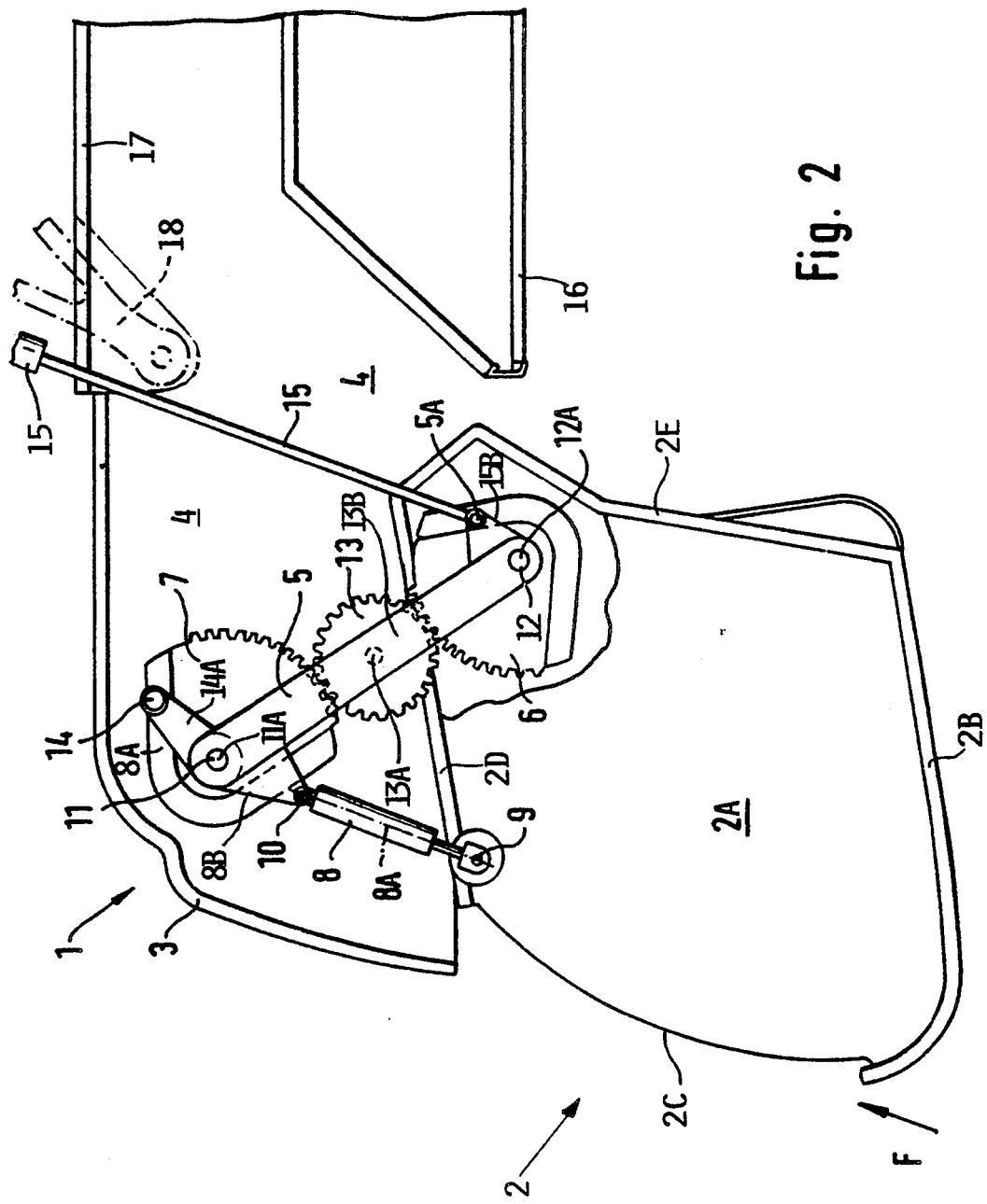
FIG. 2 is a view similar to that of FIG. 1, however showing the luggage holding trough in its opened lowered position.

A biasing device, such as a pneumatic spring 8, is connected to the guide and suspension system 1A for enhancing the manual force applied by a passenger when closing the compartment by raising the trough. The pneumatic spring 8 is a piston cylinder device, for example, that is so arranged that it counteracts the weight of the trough 2 and the weight of the luggage, thereby facilitating the closing. For this purpose, one end of the pneumatic spring 8 is pivoted by a journal 9 to the fixed side wall 4. The other end of the pneumatic spring 8 is pivoted by a journal 10 to the guide lever 5, preferably through an intermediate lever arm 8B. When the spacing between the two journal axes of the journals 9 and 10 is reduced, the lever 5 will turn clockwise during the opening motion of the trough 2. The position of the rotational axis of the journal 10 is so selected that the effective line 8A of the spring force of the pneumatic spring 8 has a variable spacing S to the first journal axis 11A. This variable spacing S is largest when the trough 2 is closed as shown in FIG. 1. This spacing S is the smallest or even zero when the effective line 8A of the spring force passes through the first journal axis 11A as shown in FIG. 2 when the trough 2 is open. This feature provides a self-locking of the guide and suspension system so that an automatic closing of the trough is prevented when the trough is in the opened position of FIG. 2. However, the operator only needs to apply a small force to overcome this self-locking when starting to move the trough 2 into the closed position of FIG. 1.

Referring further to FIG. 1, in the closed position of the trough 2, the lever 5 assumes a substantially horizontal position so that the two journals 11 and 12 are also positioned in a substantially horizontal plane. The spacing S between the line 8A in which the spring force is effective and the journal axis 11A, is now largest. As the trough 2 is tilted downwardly, the gear wheel 13 rolls along the fixed gear sector 7 while simultaneously meshing with the second gear sector 6, whereby the lever 5 is tilted downwardly and forwardly into the position shown in FIG. 2. The cooperation of the gears assures a stable, steady, and controlled motion of the trough. This motion depends on the ratio of the gear radius of the first gear sector 7 to the gear radius of the second gear sector 6. In the shown embodiment this ratio is approximately 1.2. In other words, the gear radius of the gear sector 7A is larger by about 20% than the gear radius of the second gear sector 6. However, other gear ratios may be selected, depending on the size of the trough 2 and depending on the expected weight to be carried in the trough. If the gear radius of the gear sector 7 increases, the radius of the gear sector 6 correspondingly decreases, and vice versa. To keep the gear 13 in meshing contact with both sectors 6 and 7, it is necessary to correspondingly shift the journal axis 13A along the line 13B on the guide lever 5.

As mentioned above, the pneumatic spring 8 is so positioned that the effective line 8A of the spring force travels toward the journal axis 11A, thereby reducing the spacing S even to zero, whereby the above mentioned self-locking feature is achieved to hold the trough 2 automatically in the open loading position while preventing an unintentional closing of the trough. The spacing S may even shift to the left of the journal axis 11A, thereby generating a torque moment which is opposite to that obtained in FIG. 1. However, this opposite torque moment must be kept small, because it generates a resistance against the intentional closing until this opposite torque moment has been overcome by a force F applied by the passenger to the trough 2.

In a preferred embodiment, the position of the lever arm 8B and the journal 10 is so selected that the torque moment which tends to keep the trough 2 in an open position, is just sufficient to provide an equilibrium between the torque moment and the weight of the trough 2, whereby the torque moment counteracts the weight of the trough and prevents an automatic closing of the trough. In this embodiment the line 8A in which the spring force is effective, runs slightly to the left of the first journal axis 11A as shown in FIG. 2, thereby providing the above mentioned counter-moment or counter-torque.

Once the trough 2 has been loaded in the position shown in FIG. 2, it is shifted upwardly by applying a manual force indicated by the arrow F in FIG. 2, whereby the effective line 8A of the spring force travels again away from the first journal axis 11A, thereby increasing the lever arm or spacing S. As the spacing S increases, the counterclockwise torque moment also increases, thereby assisting in the closing of the trough 2. Depending on the dimensioning of the pneumatic spring 8, the counterclockwise torque moment may correspond to the weight of the luggage in the trough to the extent that the pneumatic spring 8 provides the entire force that is necessary to close the trough 2 even when it is fully loaded.

In order to avoid that the trough closes too rapidly, for example, when it is only partially filled, a shock absorber 15 is arranged between the lever 5 and the fixed overhead structure. The shock absorbing device 15 is, for example, a piston cylinder device having a piston rod 15A journalled to the lever 5 with a journal 5A that may be directly and rigidly connected to the lever 5 or it may be connected to the lever 5 through an intermediate lever arm 15B. This shock absorber element 15 also makes sure that the downward movement of the trough 2 takes place in a controlled manner, thereby limiting the downward speed and avoiding a too rapid lowering of the trough 2, especially when it is filled.

A synchronizing bar 14 interconnects the two guide levers 5, preferably through a lever arm 14A. Thus, both guide and suspension systems 1A travel in unison on both sides of the trough, whereby it is prevented that the trough 2 can be brought out of its intended horizontal alignment. As a result, the trough 2 will always be horizontally oriented, even during travel up or down and even if the load within the trough is unevenly distributed. Depending on the position of the gear sector 7, its rims 7A may be provided with a recess 14B so that the synchronizing rod 14 may assume the position shown in FIG. 2.

A special advantage of the invention is seen in that it requires but one guide lever 5 at each end of the trough 2, yet it permits the overhead trough to safely travel up or down. As a result, the invention only requires a total of four journals, namely two (11, 12) provided at each end wall of the trough. As a result, the number of connecting journals is reduced to a minimum which in turn substantially reduces the manufacturing assembly and maintenance efforts and expenses. The reduction of the effort and expenses is particularly due to the fact that now fewer journal mounting points need to be reinforced as has been necessary heretofore, for example in the above mentioned U.S. Patent. A further advantage of the invention is seen in that the guide and suspension systems can be completely hidden between the fixed side wall 4 and the trough side wall 2A. Thus, the design of the trough is now substantially free of the requirements to be met by the guide and suspension systems.

Although the invention has been described with reference to specific example embodiments, it will be appreciated that it is intended to cover all modifications and equivalents within the scope of the appended claims.

What we claim is:

1. An overhead luggage compartment adapted for attachment to a fixed overhead structure, said luggage compartment comprising a fixed cover (3) secured to said overhead structure, a trough having a bottom for holding luggage and first and second trough side walls interconnected by said bottom, first and second trough guide suspension systems for raising and lowering said trough, said first suspension system being positioned between said first trough side wall and said fixed overhead structure, said second suspension system being positioned between said fixed overhead structure and said second side wall of said trough, each of said suspension systems comprising: first journal means (11) adapted for rigid connection to said overhead structure (4), said first journal means having a first rotational journal axis (11A), second journal means (12) rigidly connected to the respective trough side wall, said second journal means having a second rotational journal axis (12A), a guide lever (5) journalled with one end to said first journal axis of said first journal means and with its other end to said second journal axis of said second journal means, a gear wheel (13) journalled to said guide lever (5) intermediate its lever ends, said gear wheel (13) having a rotational axis (13A) positioned on said guide lever (5) on a line interconnecting said rotational axes of said first and second journal means (11, 12), a first gear sector (7) adapted for rigid connection to said overhead structure, said first gear sector (7) having a first gear center coinciding with said first journal axis (11A), a second gear sector (6) rigidly connected to said trough, said second gear sector (6) having a second gear center coinciding with said second journal axis (12A), said gear wheel (13) meshing with said first and second gear sectors (7, 6) so that said trough can be lowered by a force pulling downwardly and lifted by a force pushing upwardly.

2. The overhead luggage compartment of claim 1, further comprising a biasing spring mechanism (8) having a first lower end adapted for pivoting to said overhead structure (at 9) and a second upper end pivoted at an upper pivot point (10) to said guide lever (5), said biasing spring mechanism (8) having a spring force directed along a line (8A) extending at a spacing (S) from said first journal axis (11A), said spacing (S) being at a maximum when said trough is in an upward compartment closing position, said spacing being at a minimum or opposite when said trough is in a downward compartment open position.

3. The overhead luggage compartment of claim 2, further comprising a lever arm (8B) rigidly connected to said guide lever (5) near said first journal axis (11A), said second upper end of said damping spring mechanism (8) being pivoted at said upper pivot (10) to said bracket (8B) and through said bracket (8B) to said guide lever (5).

4. The overhead luggage compartment of claim 2, wherein said spring mechanism is a pneumatic spring (8).

5. The overhead luggage compartment of claim 1, further comprising a cross-connecting shaft (14) interconnecting said first and second suspension systems for enforcing a synchronized operation of said first and second suspension systems.

6. The overhead luggage compartment of claim 5, further comprising two link levers (14A) one of which is rigidly connected to each of said first and second suspension systems, said cross-connecting shaft being rigidly connected to said two link levers and through said link levers to said guide lever (5).

7. The overhead luggage compartment of claim 1, further comprising shock absorber means (15) adapted for connection to said overhead structure, and pivot means (5A) pivoting said shock absorber means (15) to said guide lever (5) for limiting a speed of an upward and downward motion of said trough.

8. The overhead luggage compartment of claim 7, comprising a bracket (15B) rigidly connected to said guide lever near said second rotational axis (12), said shock absorber means (15) being pivoted by said pivot means (5A) to said bracket (15B) and through said bracket (15B) to said guide lever (5).

9. The overhead luggage compartment of claim 7, wherein said shock absorber means is a piston cylinder device (15).

10. The overhead luggage compartment of claim 1, wherein said first gear sector (7) has a first radius, wherein said second gear sector (6) has a second radius, and wherein a ratio of said first radius to said second radius is 1.2.

* * * * *